United States Patent [19]

Schopper et al.

[11] 4,377,176
[45] Mar. 22, 1983

[54] PRESSURE REDUCER FOR HYDRAULIC BRAKE SYSTEMS

[75] Inventors: Bernd Schopper, Hattersheim; Peter Tandler, Falkenstein; Derek Lowe, Glashütten, all of Fed. Rep. of Germany

[73] Assignee: ITT Industries, Inc., New York, N.Y.

[21] Appl. No.: 239,734

[22] Filed: Mar. 2, 1981

[30] Foreign Application Priority Data

Mar. 12, 1980 [DE] Fed. Rep. of Germany ....... 3009427

[51] Int. Cl.³ .............................................. B60T 8/26
[52] U.S. Cl. ................................ 137/493.2; 137/505; 251/DIG. 1; 303/6 C
[58] Field of Search ............... 60/564; 137/493, 493.2, 137/505; 251/DIG. 1; 303/6 C, 22 R

[56] References Cited

U.S. PATENT DOCUMENTS

| | | | |
|---|---|---|---|
| 3,088,285 | 5/1963 | Giacosa | 60/564 |
| 3,209,542 | 10/1965 | Francia | 60/564 |
| 3,283,504 | 11/1966 | Stelzer | 303/6 C X |
| 3,814,121 | 6/1974 | Lawson | 303/6 C X |
| 4,059,174 | 11/1977 | Carre | 303/6 C X |

Primary Examiner—Robert G. Nilson
Attorney, Agent, or Firm—John T. O'Halloran; Alfred C. Hill

[57] ABSTRACT

A pressure reducer for hydraulic brake systems comprises a stepped piston carrying a sealing ring in a circumferential groove thereof. The sealing section of the sealing ring begins at the groove wall adjacent the outlet chamber and joins a transitional section of smaller diameter adjacent the inlet chamber. The sealing ring fills the groove essentially completely at least in the sealing section. Preferably the sealing ring abuts the bottom of the groove over its entire axial length. This results in a defined position for the sealing section without excessive friction and wear occurring during operation.

31 Claims, 7 Drawing Figures

PRESSURE REDUCER FOR HYDRAULIC BRAKE SYSTEMS

BACKGROUND OF THE INVENTION

The present invention relates to a pressure reducer for hydraulic brake systems comprising a stepped piston, which may be loaded by a prestressing force, displaceable within a housing bore, the smaller surface of the stepped piston facing an inlet chamber and its larger surface facing an outlet chamber. The stepped piston includes a sealing ring in a circumferential groove, the sealing ring abutting the inner surface of the housing bore by means of a sealing section of maximum diameter. The pressure reducer also includes at least one connecting channel, in particular an axial groove, extending from the outlet chamber toward the inlet chamber over some part of the length of the housing bore, with the end of the connecting channel provided in the inner wall of the housing bore being sealable by the sealing section.

In a known pressure reducer of the above type (Swedish Pat. No. 303,685), the sealing ring is an O-ring arranged in a circumferential groove of rectangular cross-section. However, it has proved that the sealing section will change its position in operation and, thus, the change-over point at which the outlet chamber is separated from the inlet chamber will change.

In a copending U.S. application of H. Seip, Ser. No. 157,579, filed June 9, 1980, now abandoned, assigned to the same assignee as the present application, a solution to the sealing section changing the change-over point has been presented. In this copending application the sealing ring is formed by a gasket which, by means of its inside circumference and its two front faces, sealingly abuts the corresponding walls of the circumferential groove of the stepped piston. The sealing section is situated near the inlet chamber end of the stepped piston and is formed as a lip. Due to the firm coupling of piston and sealing ring there results an exact definition of the change-over point. If, during operation, there are high pressure differences between inlet and outlet pressures it may, however, happen that the inlet pressure which acts radially outwards on the inner side of the lip will partially press the material of the sealing lip into the connecting channel, in particular into an axial groove. This deformation may obstruct the return of the piston and will lead to increased wear.

SUMMARY OF THE INVENTION

An object of the present invention is to provide a pressure reducer of the type described above in which there is an exact definition of the change-over point and, at the same time, keeping the friction and wear of the sealing section small.

A feature of the present invention is the provision of a pressure reducer for hydraulic brake systems comprising a stepped piston displaceable in a housing bore, the stepped piston being loaded by a prestressing force having the end surface of its smaller diameter portion facing an inlet chamber and the end surface of its larger diameter portion facing an outlet chamber; and a sealing ring disposed in a circumferential groove of the piston, the sealing ring having a sealing section of maximum diameter abutting one wall of the groove adjacent the outlet chamber and a smaller diameter transitional section extending from the sealing section toward the inlet chamber, the sealing ring completely filling the groove at least adjacent the one wall of the groove and a bottom of the groove in the area of the sealing section, the sealing section sealing an opening in the inner wall of the bore of an axial groove in the housing extending from the outlet chamber toward the inlet chamber.

The inlet pressure active in the transitional area has an axial force constituent. This will safeguard that the sealing ring will be pressed firmly against the outlet chamber side wall of the groove. Since the sealing section is situated in this area, the sealing ring construction does not permit the sealing section to shift, thereby resulting in an exact definition of the sealing section's position. It is further safeguarded that no force constituent of the inlet pressure directed radially outwards may act on the sealing section. Consequently, the operation will not be obstructed by impermissible friction or wear.

Not only does the sealing ring's essentially complete filling of the groove at the outlet chamber end thereof and, radially, within the sealing section prevent shifting of the sealing rings, but also, the inlet pressure effective in the transitional area will have a radial force constituent which will press the sealing ring firmly against the groove bottom. In particular, the sealing ring should abut the groove bottom over its entire axial length. This will result in an increased safety against a pressure building up between the sealing ring and the groove bottom if the inlet pressures are high, which pressure might bring about a force in the sealing section area which is directed radially outwards.

It will be advantageous if, in the transitional section, the sealing ring's outside diameter continuously decreases towards the inlet chamber. In particular, the transitional section may have a portion which is approximately conical. The inclination of the transistional section relative to the axis should lie between 15° and 45°. Such a continuously sloping transitional section will offer better flow conditions at the entrance to the connecting channel. Further, there will result an optimum distribution between the axial and radial force constituents of the inlet pressure acting on the sealing ring.

Further, the sealing section may merge into the transitional section by means of a curve. Thus, any points of unsteadiness will be avoided.

In one embodiment, in the area of the transitional section, the diameter of the groove bottom and the inside circumference of the sealing ring will also continuously decrease towards the inlet chamber. The sealing ring is given a very simple shape which in the axial direction may have the same thickness throughout.

It is also possible for the groove bottom to have a circumferential profile such as a rib or a groove, the inside circumference of the sealing ring having a corresponding engaging circumferential profile. In other words, if the groove bottom has a circumferential rib, the sealing ring will have a corresponding circumferential groove, or if the groove bottom has a circumferential groove, the sealing ring will have a corresponding circumferential rib. Such a profile will keep the sealing ring, and hence the sealing section, in position, axially, upon a return motion of the piston. This will be of interest if the sealing ring is not fixed axially by the inlet port side front of the groove wall, or if it is to be axially fixed near the sealing section.

In another embodiment the outlet chamber side groove wall and the associated front face of the sealing ring are inclined in a converging manner relative to the transitional section towards the inlet chamber. In this way it will be possible to achieve the advantages aimed at by means of an essentially symmetrical sealing ring. It is obvious that the inclined groove wall will maintain the sealing ring in position. Further, this embodiment will be of advantage with high inlet pressures.

In a further embodiment of this invention, at the end of the transitional section, the sealing ring will form a lip abutting the groove bottom and covering an orifice of at least one return channel connected to the outlet chamber and extending in the piston. In this way, the sealing ring will also perform the function of a check valve which will open if there is a drop in the inlet pressure below the outlet pressure.

BRIEF DESCRIPTION OF THE DRAWING

Above mentioned and other features and objects of this invention will become more apparent by reference to the following description taken in conjunction with the accompanying drawing, in which.

DESCRIPTION OF THE PREFERRED EMBODIMENTS

Figure 1:
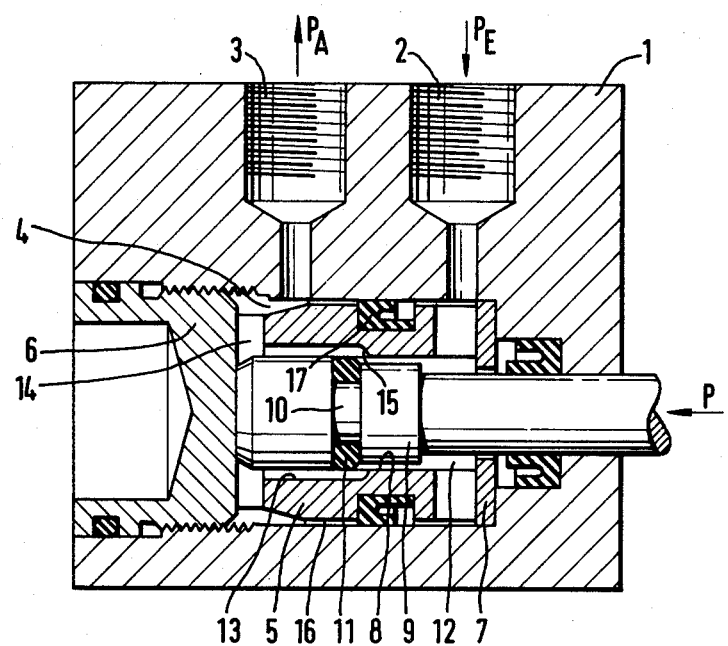
FIG. 1 is a longitudinal cross sectional view of a pressure reducer in accordance with the principles of the present invention.

Referring to FIG. 1, a housing 1 includes therein an inlet port 2 which is connected with a pressure generator, e.g. a master cylinder, and an outlet port 3 which is connected with a brake cylinder, e.g. a rear wheel cylinder. In a bore 4 of housing 1, there is an insert 5 which may be pressed against a stop washer 7 by means of a screw plug 6. Insert 5 forms a cylinder 8 having a coaxial bore in which a stepped piston 9 is axially displaceable. A prestressing force P will press piston 9 against screw plug 6. Piston 9 has an annular groove 10 in which a sealing ring 11 is disposed. In the rest position, an inlet chamber 12 connected with inlet port 2 communicates with an outlet chamber 14 via connecting channels constructed as axial grooves 13 situated in cylinder 8, the outlet port 3 branching off from outlet chamber 14. Sealing ring 11 may override end 15 of axial grooves 13, thus separating the inlet and outlet chambers 12 and 14. A gap 16 is sealed by a gasket 17 disposed at the circumference of insert 5.

If during operation an inlet pressure $P_E$ is supplied via inlet port 2, pressure $P_E$ will propagate to outlet port 3. Thus, the outlet pressure $P_A$ will be equal to inlet pressure $P_E$. With inlet pressure increasing, stepped piston 9 will move to the right in the drawing against prestressing force P since the effective pressure surface of piston 9 facing outlet chamber 14 is larger than the annular effective pressure surface facing inlet chamber 12. At a predetermined change-over value of inlet pressure $P_E$, sealing ring 11 will seal end 15 of axial grooves 13. Now the outlet pressure will increase at a lower rate than the inlet pressure since the surface ratio of stepped piston 9 will make itself felt in the pressure transmittance. If inlet pressure $P_E$ is reduced, outlet pressure $P_A$ will prevail but will decrease completely towards the inlet pressure. Consequently, piston 9 will return to its rest position.

Figure 2:
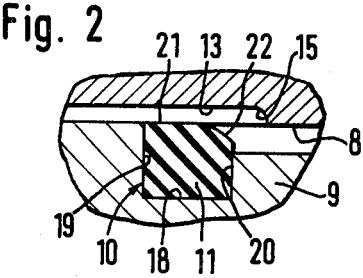
FIG. 2 is an enlarged illustration of the sealing ring used in FIG. 1.

FIG. 2 shows, on an enlarged scale, that sealing ring 11 sealingly rests on the bottom 18 of groove 10 by means of its inside circumferential surface, while it sealingly rests against the groove walls 19 and 20 by means of its two front faces. The outside circumference of sealing ring 11 has a sealing section 21 of maximum diameter which starts at the outlet chamber side groove wall 19 and which abuts the inner wall of the bore of cylinder 8. Towards inlet chamber 12, sealing ring 11 includes a transitional section 22 whose diameter gradually decreases.

As soon as piston 9 assumes its closed position, inlet pressure $P_E$ which reliably presses the sealing ring 11 against groove bottom 18 and front groove wall 19 will become effective on transitional section 22. Due to this action, sealing section 21 will maintain its position because of the impossibility of any deformation of sealing ring 11 which fills the entire space of groove 10 within sealing section 21 and transitional section 22. The inlet pressure acting on transitional section 22 causes an increased contact pressure between the surfaces of sealing section 21 and the inner surface of the bore of cylinder 8 due to elastic deformation of the material of sealing ring 11. This increased contact pressure will be small enough that it will not disturb and, above all, will not be able to cause the material of sealing ring 11 to be pressed into axial groove 13.

Figure 3:
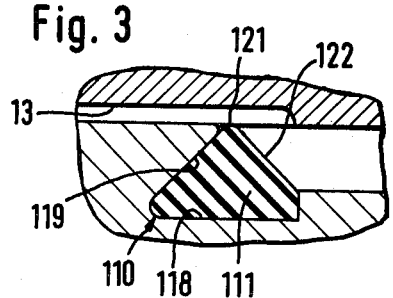
FIGS. 3 through 7 illustrate other embodiments of sealing rings suitable for use in the pressure reducer of FIG. 1.

In the embodiment illustrated in FIG. 3 corresponding parts have the same reference numerals as FIGS. 1 and 2 increased by 100. The sealing ring 111 will be seated in a circumferential groove 110 which has a cylindrical groove bottom 118, yet a conical front face 119. In this construction, immediately next to sealing section 121, sealing ring 111 is also supported by the material of the piston. There is a marked transitional section 122. If in the closed position the inlet pressure acts on this transitional section 122, again, the sealing ring's reliable abutting against surfaces 118 and 119 will be safeguarded. Here, also, the change-over point is exactly defined.

Figure 4:
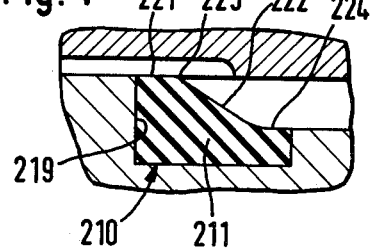

In the embodiment illustrated in FIG. 4 corresponding parts have the same reference numerals as in FIGS. 1 and 2 increased by 200. In this embodiment, the sealing section 221 is also situated at the outlet chamber side of the groove 210. The transitional section 222 has a conical shape and merges into the sealing section 221 by means of a curve 223. At the other end, section 222 has a continuation 224.

Figure 5:
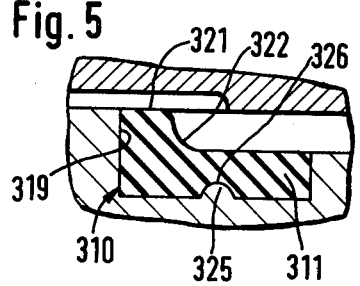

In the embodiment illustrated in FIG. 5, the reference numerals of parts corresponding to FIGS. 1 and 2 have been increased by 300. In this embodiment, the groove 310 has a circumferential rib 325, while the sealing ring 311 has a corresponding circumferential groove. Thereby, sealing ring 311 is additionally fixed axially near the sealing section 321. Further, the transitional section 322 essentially will be effective up to the area of the rib 325, only, since deformations in the portion of sealing ring 311 to the right of rib 325 will have no effect on sealing section 321.

Figure 6:
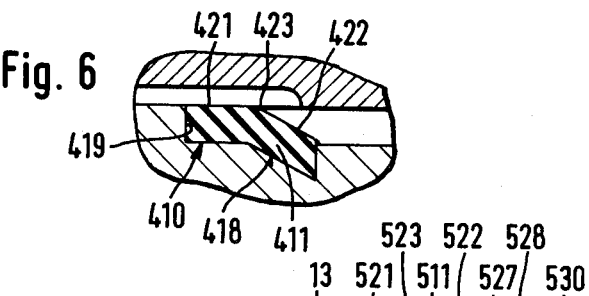
Figure 7:
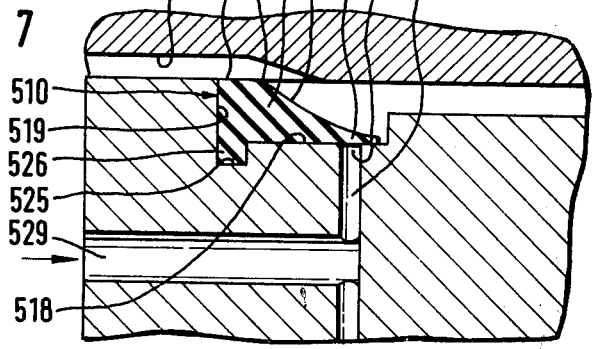

In the embodiment illustrated in FIG. 6, corresponding parts have the same reference numerals as in FIGS. 1 and 2 increased by 400. In this embodiment, the sealing ring 411 has a wall thickness which throughout is approximately the same since the diameter of the groove bottom 418 is also tapering in the area of the transitional section 422. Nevertheless, the same advantages are achieved as in the other embodiments. p In the embodiment illustrated in FIG. 7, corresponding parts have the same reference numerals as in FIGS. 1 and 2 increased by 500. The sealing ring 511 essentially has the shape of the sealing ring 211 of FIG. 4. However, radially within the sealing section 521, sealing ring 511 has a circumferential rib 526 engaging a circumferential groove 525 for the purpose of axial fixation. Further, the inlet chamber side of sealing ring 511 is constructed as lip 527 covering several small orifices 528 of a return channel system including a central bore 529 and several radial bores 530. Lip 527 will open if the outlet pressure exceeds the inlet pressure. In this case, the gasket 17 of FIG. 1 may be dispensed with.

Instead of axial grooves 13, it is also possible to use channels which will end in the bore of cylinder 8 by means of a bore or by means of an annular gap, only, or to simply use a diameter enlargement.

While we have described above the principles of our invention in connection with specific apparatus, it is to be clearly understood that this description is made only by way of example and not as a limitation to the scope of our invention as set forth in the objects thereof and in the accompanying claims.

We claim:

1. A pressure reducer for hydraulic brake systems comprising:
   a stepped piston displaceable in a housing bore, said stepped piston being loaded by a prestressing force having the end surface of its smaller diameter portion disposed in an inlet chamber and the end surface of its larger diameter portion disposed in an outlet chamber; and
   a sealing ring disposed in a circumferential groove in said piston, said groove having one wall adjacent said outlet chamber disposed in a step between said larger diameter portion and said smaller diameter portion extending radially from a bottom of said groove to the outer surface of said larger diameter portion and another wall parallel to said one wall adjacent said inlet chamber extending radially from said bottom of said groove to the outer surface of said smaller diameter portion, said sealing ring having a sealing section of maximum diameter with an end wall thereof abutting said one wall of said groove and a smaller diameter transitional section extending from said sealing section toward said inlet chamber, and said sealing ring completely filling said groove at least adjacent said one wall of said groove and said bottom of said groove in the area of said sealing section, said sealing section sealing an opening in the inner wall of said bore of an axial groove in said housing extending from said outlet chamber toward said inlet chamber.

2. A pressure reducer according to claim 1, wherein said sealing ring abuts said bottom of said groove over the entire length thereof.

3. A pressure reducer according to claims 1 or 2, wherein
   the diameter of said transitional section continuously decreases from said maximum diameter to a minimum diameter adjacent said inlet chamber.

4. A pressure reducer according to claim 3, wherein the inclination of said transitional section relative to the longitudinal axis of said piston lies between 15° and 45°.

5. A pressure reducer according to claim 3, wherein said transitional section includes a portion which is substantially conical.

6. A pressure reducer according to claim 5, wherein the inclination of said transitional section relative to the longitudinal axis of said piston lies between 15° and 45°.

7. A pressure reducer according to claim 6, wherein said sealing section merges into said transitional section by means of a curve.

8. A pressure reducer according to claim 5, wherein said sealing section merges into said transitional section by means of a curve.

9. A pressure reducer according to claim 3, wherein said sealing section merges into said transitional section by means of a curve.

10. A pressure reducer according to claims 1 or 2, wherein
    said sealing section merges into said transitional section by means of a curve.

11. A pressure reducer according to claim 3, wherein in the area of said transitional section the diameter of said bottom of said groove and the inner circumference of said sealing ring continuously decreases towards said inlet chamber.

12. A pressure reducer according to claim 11, wherein
    the inclination of said transitional section and said bottom of said groove relative to the longitudinal axis of said piston is between 15° and 45°.

13. A pressure reducer according to claim 11, wherein
    said bottom of said groove has a circumferential profile and the inside wall of said sealing ring has a corresponding engaging circumferential profile.

14. A pressure reducer according to claim 5, wherein said bottom of said groove has a circumferential profile and the inside wall of said sealing ring has a corresponding engaging circumferential profile.

15. A pressure reducer according to claim 3, wherein said bottom of said groove has a circumferential profile and the inside wall of said sealing ring has a corresponding engaging circumferential profile.

16. A pressure reducer according to claims 1 or 2, wherein
    said bottom of said groove has a circumferential profile and the inside wall of said sealing ring has a corresponding engaging circumferential profile.

17. A pressure reducer according to claim 5, wherein said one wall of said groove and said abutting end wall of said sealing section are inclined toward said inlet chamber.

18. A pressure reducer according to claim 17, wherein
    the inclination of said one wall and said abutting end wall of said sealing section relative to the longitudinal axis of said piston lies between 15° and 45°.

19. A pressure reducer according to claim 3, wherein said one wall of said groove and said abutting end wall of said sealing section are inclined toward said inlet chamber.

20. A pressure reducer according to claim 19, wherein
    the inclination of said one wall and said abutting end wall of said sealing section relative to the longitudinal axis of said piston lies between 15° and 45°.

21. A pressure reducer according to claims 1 or 2, wherein
    said one wall of said groove and said abutting end wall of said sealing section are inclined toward said inlet chamber.

22. A pressure reducer according to claim 21, wherein
the inclination of said one wall and said abutting end wall of said sealing section relative to the longitudinal axis of said piston lies between 15° and 45°.

23. A pressure reducer according to claims 1 or 2, wherein
said sealing ring further includes a lip extending from said transitional section toward said inlet chamber abutting said bottom of said groove and covering an orifice in said bottom of said groove of at least one return channel connected with said outlet chamber present in said piston.

24. A pressure reducer according to claim 23, wherein
the diameter of said transitional section continuously decreases from said maximum diameter to a minimum diameter adjacent said inlet chamber.

25. A pressure reducer according to claim 24, wherein
said bottom of said groove has a circumferential profile and the inside wall of said sealing ring has a corresponding engaging circumferential profile.

26. A pressure reducer for hydraulic brake systems comprising:
a stepped piston displaceable in a housing bore, said stepped piston being loaded by a prestressing force having the end surface of its smaller diameter portion facing an inlet chamber and the end surface of its larger diameter portion facing an outlet chamber; and
a sealing ring disposed in a circumferential groove of said piston, said sealing ring having a sealing section of maximum diameter abutting one wall of said groove adjacent said outlet chamber and a smaller diameter transitional section extending from said sealing section toward said inlet chamber, said sealing ring completely filling said groove at least adjacent said one wall of said groove and a bottom of said groove in the area of said sealing section, said sealing section sealing an opening in the inner wall of said bore of an axial groove in said housing extending from said outlet chamber toward said inlet chamber;
said sealing ring abutting said bottom of said groove over the entire length thereof;
said sealing ring further including a lip extending from said transitional section toward said inlet chamber abutting said bottom of said groove and covering an orifice in said bottom of said groove of at least one return channel connected with said outlet chamber present in said piston.

27. A pressure reducer according to claim 26, wherein
the diameter of said transitional section continuously decreases from said maximum diameter to a minimum diameter adjacent said inlet chamber.

28. A pressure reducer according to claim 27, wherein
said bottom of said groove has a circumferential profile and the inside wall of said sealing ring has a corresponding engaging circumferential profile.

29. A pressure reducer for hydraulic brake systems comprising:
a stepped piston displaceable in a housing bore, said stepped piston being loaded by a prestressing force having the end surface of its smaller diameter portion facing an inlet chamber and the end surface of its larger diameter portion facing an outlet chamber; and
a sealing ring disposed in a circumferential groove of said piston, said sealing ring having a sealing section of maximum diameter abutting one wall of said groove adjacent said outlet chamber and a smaller diameter transitional section extending from said sealing section toward said inlet chamber, said sealing ring completely filling said groove at least adjacent said one wall of groove and a bottom of said groove in the area of said sealing section, said sealing section sealing an opening in the inner wall of said bore of an axial groove in said housing extending from said outlet chamber toward said inlet chamber;
said sealing ring further including a lip extending from said transitional section toward said inlet chamber abutting said bottom of said groove and covering an orifice in said bottom of said groove of at least one return channel connected with said outlet chamber present in said piston.

30. A pressure reducer according to claim 29, wherein
the diameter of said transitional section continuously decreases from said maximum diameter to a minimum diameter adjacent said inlet chamber.

31. A pressure reducer according to claim 30, wherein
said bottom of said groove has a circumferential profile and the inside wall of said sealing ring has a corresponding engaging circumferential profile.

* * * * *